United States Patent
Robinson et al.

(10) Patent No.: US 7,836,485 B2
(45) Date of Patent: *Nov. 16, 2010

(54) SYSTEM AND METHOD FOR ENROLLING IN A BIOMETRIC SYSTEM

(76) Inventors: Timothy L. Robinson, 12145 Chancery Station Circle, Reston, VA (US) 20190; Bradford R. Schildt, 560 S. 41st St., Boulder, CO (US) 80305; Tennille V. Goff, 7710 Heming Place, Springfield, VA (US) 22151; Mark B. Robinson, 16 Knob Hill Rd., Norwalk, CT (US) 06851

( * ) Notice: Subject to any disclaimer, the term of this patent is extended or adjusted under 35 U.S.C. 154(b) by 251 days.

This patent is subject to a terminal disclaimer.

(21) Appl. No.: 12/110,968

(22) Filed: Apr. 28, 2008

(65) Prior Publication Data
US 2008/0271116 A1 Oct. 30, 2008

Related U.S. Application Data

(63) Continuation of application No. 10/743,189, filed on Dec. 23, 2003, now Pat. No. 7,367,049, which is a continuation-in-part of application No. 10/678,646, filed on Oct. 6, 2003, which is a continuation-in-part of application No. 10/251,305, filed on Sep. 20, 2002, now Pat. No. 7,269,737.

(60) Provisional application No. 60/324,229, filed on Sep. 21, 2001.

(51) Int. Cl.
H04L 9/32 (2006.01)
H04L 9/00 (2006.01)

(52) U.S. Cl. .............................. 726/2; 726/9; 713/185; 713/186
(58) Field of Classification Search .................. 726/2–5, 726/27–30, 9; 713/182, 184–186; 382/116–119, 382/124, 129
See application file for complete search history.

(56) References Cited

U.S. PATENT DOCUMENTS

| 4,230,214 A | 10/1980 | Cortez |
| 4,359,631 A | 11/1982 | Lockwood et al. |

(Continued)

FOREIGN PATENT DOCUMENTS

EP 0598469 A2 5/1994

(Continued)

OTHER PUBLICATIONS

U.S. Appl. No. 10/678,646, filed Oct. 6, 2003, Robinson et al.

(Continued)

*Primary Examiner*—Hosuk Song

(57) ABSTRACT

The present invention is a system and method of enrolling potential system users for a biometric system for identity verification. Potential system user information is entered into the system, either by the user or a system operator, and is stored as a partially-enabled user record. The user of a partially-enabled user record fully enables the record by presenting information previously stored in the user record and presenting the remainder of user information necessary to complete record activation. Enrollment data is used to authenticate the system user's identity and authorize related transaction accesses in a biometric system for identity verification.

12 Claims, 5 Drawing Sheets

U.S. PATENT DOCUMENTS

| | | |
|---|---|---|
| 4,553,222 A | 11/1985 | Kurland et al. |
| 4,716,593 A | 12/1987 | Hirai et al. |
| 4,879,747 A | 11/1989 | Leighton et al. |
| 4,915,205 A | 4/1990 | Reid et al. |
| 4,995,081 A | 2/1991 | Leighton et al. |
| 5,042,073 A | 8/1991 | Collot et al. |
| 5,067,162 A | 11/1991 | Driscoll et al. |
| 5,086,389 A | 2/1992 | Hassett et al. |
| 5,144,553 A | 9/1992 | Hassett et al. |
| 5,274,695 A | 12/1993 | Green |
| 5,280,527 A | 1/1994 | Gullman et al. |
| 5,289,183 A | 2/1994 | Hassett et al. |
| 5,335,288 A | 8/1994 | Faulkner |
| 5,351,187 A | 9/1994 | Hassett |
| 5,352,876 A | 10/1994 | Watanabe et al. |
| 5,386,104 A | 1/1995 | Sime |
| 5,412,738 A | 5/1995 | Brunelli et al. |
| 5,450,980 A | 9/1995 | Laidlaw |
| 5,453,601 A | 9/1995 | Rosen |
| 5,455,407 A | 10/1995 | Rosen |
| 5,483,601 A | 1/1996 | Faulkner |
| 5,485,510 A | 1/1996 | Colbert |
| 5,523,551 A | 6/1996 | Scott |
| 5,534,855 A * | 7/1996 | Shockley et al. ........... 340/5.52 |
| 5,546,523 A | 8/1996 | Gatto |
| 5,581,630 A | 12/1996 | Bonneau, Jr. |
| 5,594,806 A | 1/1997 | Colbert |
| 5,596,718 A | 1/1997 | Boebert et al. |
| 5,598,474 A | 1/1997 | Johnson |
| 5,602,933 A | 2/1997 | Blackwell et al. |
| 5,613,012 A | 3/1997 | Hoffman et al. |
| 5,615,217 A | 3/1997 | Horne et al. |
| 5,615,277 A | 3/1997 | Hoffman |
| 5,657,389 A | 8/1997 | Houvener |
| 5,679,938 A | 10/1997 | Templeton et al. |
| 5,688,974 A | 11/1997 | Devine et al. |
| 5,696,739 A | 12/1997 | Chang |
| 5,719,950 A | 2/1998 | Osten et al. |
| 5,722,526 A | 3/1998 | Sharrard |
| 5,737,439 A | 4/1998 | Lapsley et al. |
| 5,745,598 A | 4/1998 | Shaw et al. |
| 5,751,973 A | 5/1998 | Hassett |
| 5,764,789 A | 6/1998 | Pare, Jr. et al. |
| 5,790,674 A | 8/1998 | Houvener et al. |
| 5,790,785 A | 8/1998 | Klug et al. |
| 5,799,092 A | 8/1998 | Kristol et al. |
| 5,802,199 A | 9/1998 | Pare, Jr. et al. |
| 5,805,082 A | 9/1998 | Hassett |
| 5,805,719 A | 9/1998 | Pare, Jr. et al. |
| 5,832,464 A | 11/1998 | Houvener et al. |
| 5,838,812 A | 11/1998 | Pare, Jr. et al. |
| 5,845,256 A | 12/1998 | Pescitelli et al. |
| 5,850,442 A | 12/1998 | Muftic |
| 5,857,079 A | 1/1999 | Claus et al. |
| 5,864,623 A | 1/1999 | Messina et al. |
| 5,870,723 A | 2/1999 | Pare, Jr. et al. |
| 5,872,834 A | 2/1999 | Teitelbaum |
| 5,893,075 A | 4/1999 | Plainfield et al. |
| 5,897,616 A | 4/1999 | Kanevsky et al. |
| 5,910,988 A | 6/1999 | Ballard |
| 5,914,472 A | 6/1999 | Foladare et al. |
| 5,927,544 A | 7/1999 | Kanoh et al. |
| 5,930,804 A | 7/1999 | Yu et al. |
| 5,933,816 A | 8/1999 | Zeanah et al. |
| 5,943,423 A | 8/1999 | Muftic |
| 5,982,914 A | 11/1999 | Lee et al. |
| 5,984,366 A | 11/1999 | Priddy |
| 6,009,411 A | 12/1999 | Kepecs |
| 6,012,039 A | 1/2000 | Hoffman et al. |
| 6,028,950 A | 2/2000 | Merjanian |
| 6,032,137 A | 2/2000 | Ballard |
| 6,040,783 A | 3/2000 | Houvener et al. |
| D425,800 S | 5/2000 | Shin |
| 6,061,660 A | 5/2000 | Eggleston et al. |
| 6,070,141 A | 5/2000 | Houvener et al. |
| 6,070,147 A | 5/2000 | Harms et al. |
| 6,092,192 A | 7/2000 | Kanevsky et al. |
| 6,094,632 A | 7/2000 | Hattori |
| 6,105,010 A | 8/2000 | Musgrave |
| 6,119,932 A | 9/2000 | Maloney et al. |
| 6,148,091 A | 11/2000 | DiMaria |
| 6,149,055 A | 11/2000 | Gatto |
| 6,154,879 A | 11/2000 | Pare, Jr. et al. |
| 6,157,314 A | 12/2000 | Loftus |
| 6,160,903 A | 12/2000 | Hamid et al. |
| 6,161,059 A | 12/2000 | Tedesco et al. |
| 6,161,090 A | 12/2000 | Kanevsky et al. |
| 6,167,517 A | 12/2000 | Gilchrist et al. |
| 6,175,922 B1 | 1/2001 | Wang |
| 6,181,807 B1 | 1/2001 | Setlak et al. |
| 6,192,142 B1 | 2/2001 | Pare, Jr. et al. |
| 6,196,460 B1 | 3/2001 | Shin |
| 6,202,055 B1 | 3/2001 | Houvener et al. |
| 6,222,914 B1 | 4/2001 | McMullin |
| 6,230,148 B1 | 5/2001 | Pare, Jr. et al. |
| 6,233,564 B1 | 5/2001 | Schulze, Jr. |
| 6,246,751 B1 | 6/2001 | Bergl et al. |
| 6,256,737 B1 | 7/2001 | Bianco et al. |
| 6,269,348 B1 | 7/2001 | Pare, Jr. et al. |
| 6,282,658 B2 | 8/2001 | French et al. |
| 6,307,955 B1 | 10/2001 | Zank et al. |
| 6,307,956 B1 | 10/2001 | Black |
| 6,310,966 B1 | 10/2001 | Dulude et al. |
| 6,314,169 B1 | 11/2001 | Schelberg, Jr. et al. |
| 6,317,723 B1 | 11/2001 | Walker et al. |
| 6,317,834 B1 | 11/2001 | Gennaro et al. |
| 6,321,339 B1 | 11/2001 | French et al. |
| 6,327,573 B1 | 12/2001 | Walker et al. |
| 6,330,543 B1 | 12/2001 | Kepecs |
| 6,332,134 B1 | 12/2001 | Foster |
| 6,334,109 B1 | 12/2001 | Kanevsky et al. |
| 6,334,112 B1 | 12/2001 | Walker et al. |
| 6,334,113 B1 | 12/2001 | Walker et al. |
| 6,341,169 B1 | 1/2002 | Cadorette, Jr. et al. |
| 6,345,263 B1 | 2/2002 | Matsumoto et al. |
| 6,363,485 B1 | 3/2002 | Adams et al. |
| 6,366,682 B1 | 4/2002 | Hoffman et al. |
| 6,370,649 B1 | 4/2002 | Angelo et al. |
| 6,381,344 B1 | 4/2002 | Smithies et al. |
| 6,389,401 B1 | 5/2002 | Kepecs |
| 6,397,126 B1 | 5/2002 | Nelson |
| 6,397,198 B1 | 5/2002 | Hoffman et al. |
| 6,405,125 B1 | 6/2002 | Ayed |
| 6,415,262 B1 | 7/2002 | Walker et al. |
| 6,422,464 B1 | 7/2002 | Terranova |
| 6,424,249 B1 | 7/2002 | Houvener |
| 6,433,818 B1 | 8/2002 | Steinberg et al. |
| 6,446,044 B1 | 9/2002 | Luth et al. |
| 6,463,127 B1 | 10/2002 | Maier et al. |
| 6,466,917 B1 | 10/2002 | Goyal et al. |
| 6,470,233 B1 | 10/2002 | Johnson, Jr. |
| 6,470,322 B1 | 10/2002 | Walker et al. |
| 6,477,509 B1 | 11/2002 | Hammons et al. |
| 6,496,595 B1 | 12/2002 | Pucheck et al. |
| 6,497,360 B1 | 12/2002 | Schulze, Jr. |
| 6,498,970 B2 | 12/2002 | Colmenarez et al. |
| 6,507,912 B1 | 1/2003 | Matyas, Jr. et al. |
| 6,522,772 B1 | 2/2003 | Morrison et al. |
| 6,523,741 B1 | 2/2003 | DiMaria et al. |
| 6,529,871 B1 | 3/2003 | Kanevsky et al. |
| 6,529,878 B2 | 3/2003 | DeRafael et al. |
| 6,532,459 B1 | 3/2003 | Berson |
| 6,539,282 B2 | 3/2003 | Metcalf et al. |
| 6,542,874 B1 | 4/2003 | Walker et al. |

| | | |
|---|---|---|
| 6,554,705 B1 | 4/2003 | Cumbers |
| 6,559,776 B2 | 5/2003 | Katz |
| 6,567,787 B1 | 5/2003 | Walker et al. |
| 6,581,042 B2 | 6/2003 | Pare, Jr. et al. |
| 6,591,224 B1 | 7/2003 | Sullivan et al. |
| 6,594,376 B2 | 7/2003 | Hoffman et al. |
| 6,598,023 B1 | 7/2003 | Drummmond et al. |
| 6,636,973 B1 | 10/2003 | Novoa et al. |
| 6,646,568 B2 | 11/2003 | MacPhail et al. |
| 6,647,372 B1 | 11/2003 | Brady et al. |
| 6,650,999 B1 | 11/2003 | Brust et al. |
| 6,651,063 B1 | 11/2003 | Vorobiev |
| 6,653,946 B1 | 11/2003 | Hassett |
| 6,655,585 B2 | 12/2003 | Shinn |
| 6,662,166 B2 | 12/2003 | Pare, Jr. et al. |
| 6,685,088 B1 | 2/2004 | Royer et al. |
| 6,694,300 B1 | 2/2004 | Walker et al. |
| 6,695,206 B2 | 2/2004 | Ross |
| 6,715,673 B2 | 4/2004 | Fulcher et al. |
| 6,715,674 B2 | 4/2004 | Schneider et al. |
| 6,738,901 B1 * | 5/2004 | Boyles et al. ............... 713/159 |
| 6,745,327 B1 | 6/2004 | Messing |
| 6,748,365 B1 | 6/2004 | Quinlan et al. |
| 6,755,344 B1 | 6/2004 | Mollett et al. |
| 6,792,334 B2 | 9/2004 | Metcalf et al. |
| 6,792,422 B1 | 9/2004 | Stride et al. |
| 6,796,492 B1 | 9/2004 | Gatto |
| 6,796,499 B1 | 9/2004 | Wang |
| 6,827,260 B2 | 12/2004 | Stoutenburg et al. |
| 6,847,935 B1 | 1/2005 | Solomon et al. |
| 6,854,642 B2 | 2/2005 | Metcalf et al. |
| 6,865,544 B1 | 3/2005 | Austin |
| 6,871,287 B1 | 3/2005 | Ellingson |
| 6,873,969 B2 | 3/2005 | Stone et al. |
| 6,886,742 B2 | 5/2005 | Stoutenburg et al. |
| 6,892,178 B1 | 5/2005 | Zacharia |
| 6,895,385 B1 | 5/2005 | Zacharia et al. |
| 6,928,546 B1 | 8/2005 | Nanavati |
| 6,935,559 B2 | 8/2005 | Mollett et al. |
| 6,938,160 B2 | 8/2005 | Oono |
| 6,959,381 B2 | 10/2005 | Wheeler et al. |
| 7,006,983 B1 | 2/2006 | Packes et al. |
| 7,269,737 B2 | 9/2007 | Robinson |
| 7,367,049 B1 | 4/2008 | Robinson et al. |
| 7,630,986 B1 | 12/2009 | Herz et al. |
| 2001/0000535 A1 | 4/2001 | Lapsley et al. |
| 2001/0011680 A1 | 8/2001 | Soltesz et al. |
| 2001/0025245 A1 | 9/2001 | Flickinger et al. |
| 2001/0034609 A1 | 10/2001 | Dovolis |
| 2001/0042022 A1 | 11/2001 | Kirkpatrick et al. |
| 2001/0047223 A1 | 11/2001 | Metcalf et al. |
| 2001/0047343 A1 | 11/2001 | Dahan et al. |
| 2002/0019811 A1 | 2/2002 | Lapsley et al. |
| 2002/0029196 A1 | 3/2002 | Metcalf et al. |
| 2002/0038165 A1 | 3/2002 | McHale, IV et al. |
| 2002/0046121 A1 | 4/2002 | Walker et al. |
| 2002/0062249 A1 | 5/2002 | Iannacci |
| 2002/0065763 A1 | 5/2002 | Taylor et al. |
| 2002/0077889 A1 | 6/2002 | Kolls |
| 2002/0077890 A1 | 6/2002 | LaPointe et al. |
| 2002/0077902 A1 | 6/2002 | Marcus |
| 2002/0087413 A1 | 7/2002 | Mahaffy et al. |
| 2002/0091537 A1 | 7/2002 | Algazi |
| 2002/0094111 A1 | 7/2002 | Pucheck et al. |
| 2002/0111917 A1 | 8/2002 | Hoffman et al. |
| 2002/0112177 A1 | 8/2002 | Voltmer et al. |
| 2002/0116266 A1 | 8/2002 | Marshall |
| 2002/0128851 A1 | 9/2002 | Chefalas et al. |
| 2002/0148892 A1 | 10/2002 | Bardwell |
| 2002/0153414 A1 | 10/2002 | Stoutenburg et al. |
| 2002/0161629 A1 | 10/2002 | Jentoft |
| 2002/0162031 A1 | 10/2002 | Levin et al. |
| 2002/0173986 A1 | 11/2002 | Lehew et al. |
| 2002/0178063 A1 | 11/2002 | Gravelle et al. |
| 2002/0194128 A1 | 12/2002 | Matitzen et al. |
| 2002/0196963 A1 | 12/2002 | Bardwell |
| 2003/0006277 A1 | 1/2003 | Maskatiya et al. |
| 2003/0009382 A1 | 1/2003 | D'Arbeloff et al. |
| 2003/0009393 A1 | 1/2003 | Norris |
| 2003/0018522 A1 | 1/2003 | Denimarck et al. |
| 2003/0018567 A1 | 1/2003 | Flitcroft et al. |
| 2003/0034876 A1 | 2/2003 | Puchek et al. |
| 2003/0046228 A1 | 3/2003 | Berney |
| 2003/0055727 A1 | 3/2003 | Walker |
| 2003/0067396 A1 | 4/2003 | Hassett |
| 2003/0075287 A1 | 4/2003 | Weik, III |
| 2003/0076417 A1 | 4/2003 | Thomas et al. |
| 2003/0090473 A1 | 5/2003 | Joshi |
| 2003/0105725 A1 | 6/2003 | Hoffman |
| 2003/0130954 A1 | 7/2003 | Carr et al. |
| 2003/0144956 A1 | 7/2003 | Yu, Jr. et al. |
| 2003/0150907 A1 | 8/2003 | Metcalf et al. |
| 2003/0183689 A1 | 10/2003 | Swift et al. |
| 2003/0187790 A1 | 10/2003 | Swift et al. |
| 2003/0187796 A1 | 10/2003 | Swift et al. |
| 2003/0191709 A1 | 10/2003 | Elston et al. |
| 2003/0209599 A1 | 11/2003 | Gatto |
| 2003/0216967 A1 | 11/2003 | Williams |
| 2003/0216987 A1 | 11/2003 | Mollett et al. |
| 2003/0222135 A1 | 12/2003 | Stoutenburg et al. |
| 2003/0229539 A1 | 12/2003 | Algiene |
| 2003/0229540 A1 | 12/2003 | Algiene |
| 2003/0229790 A1 | 12/2003 | Russell |
| 2003/0236704 A1 | 12/2003 | Antonucci |
| 2004/0012481 A1 | 1/2004 | Brusseaux |
| 2004/0020982 A1 | 2/2004 | Hoffman et al. |
| 2004/0024672 A1 | 2/2004 | Brack et al. |
| 2004/0039632 A1 | 2/2004 | Han et al. |
| 2004/0054587 A1 | 3/2004 | Dev et al. |
| 2004/0083172 A1 | 4/2004 | Wiederin |
| 2004/0088232 A1 | 5/2004 | Minnis, Jr. |
| 2004/0088295 A1 | 5/2004 | Glazer et al. |
| 2004/0143505 A1 | 7/2004 | Kovach |
| 2004/0155101 A1 | 8/2004 | Royer et al. |
| 2004/0158524 A1 | 8/2004 | Anderson et al. |
| 2004/0192434 A1 | 9/2004 | Walker et al. |
| 2004/0201520 A1 | 10/2004 | Flick |
| 2004/0215565 A1 | 10/2004 | Huffman |
| 2004/0254840 A1 | 12/2004 | Slemmer et al. |
| 2005/0010478 A1 | 1/2005 | Gravelle |
| 2005/0055582 A1 | 3/2005 | Bazakos et al. |
| 2005/0144133 A1 | 6/2005 | Hoffman et al. |
| 2005/0165700 A1 | 7/2005 | Karthik |
| 2005/0251688 A1 | 11/2005 | Nanavati |

FOREIGN PATENT DOCUMENTS

| | | |
|---|---|---|
| EP | 0762261 A2 | 3/1997 |
| JP | 358044583 | 3/1983 |
| WO | WO 99/47989 A1 | 9/1999 |
| WO | WO 01/20525 A1 | 3/2001 |
| WO | WO 01/61601 A1 | 8/2001 |
| WO | WO 01/65338 B1 | 3/2002 |

OTHER PUBLICATIONS

Office of NYS Attorney General Eliot Spitzer. Financial Giant Joins Fight Against Online Gambling. Press Release. www.oag.state.ny.us/press/2002/jun/jun14a_02.html (printed Jun. 23, 2006).

Zions Bank, Cards for Any Business Occasion, www.zionsbank.com/bank_cards.jsp?leftNav=bf_bfinance&topNav=bfinance (printed Jun. 23, 2006).

ABSA. Purchasing Credit Card, www.absa.co.za/Corporate/0,2999,2210,00.html (printed Jun. 29, 2006).

Visa U.S.A. Visa Purchasing. www.usa.visa.com/corporate/corporate_solutions/payment/visa_purchasing.html?it=corporate/corporate_solutions/index%2Ehtml | Visa%20Purchasing%20 (printed Jun. 23, 2006).

University of Wisconsin-Green Bay, Purchasing Department: Purchasing Card. www.uwgb.edu/Purchasing/purchasingCard/procurement07.htm (May 4, 2005).

Reference Guides Glossary Terms (Online Glossary Terms and Definitions), Merchant Glossary: Merchant Category Code (MCC) (Merchant Category Code) (MCC) Help), www.glossary.reference-guides.com/Merchant/Merchant_Category_Code_MCC/. 2003 (Apr. 27, 2005).

University of Denver, Purchasing Card User Guide. www.du.edu/purchasing/purcard.html#2.%20HOW%20DOES%20THE%20CARD%20WORK? (printed Oct. 30, 2008).

Williams College Controller's Office. Purchasing Card Procedures. www.williams.edu/admin/controller/pcard.html#whatis. Jan. 2005 (printed Jun. 23, 2006).

Arizona State University. The Purchasing Card: A Guide for Users. www.asu.edu/purchasing/pdf/purchcard.pdf. Jan. 2005 (printed Aug. 17, 2005).

For Dining In, Security is the Order of the Day, Post-9/11 Concerns Thwarting Deliverymen: [Final Edition], the Washington Post, Washington, DC, Jan. 18, 2004, p. A.03 (printed Jul. 26, 2004).

MorphoTouch: Multi-Application Finger Identification in the Palm of Your Hand, Sagem Morpho, Inc., 1999.

"The Biometric Bar Tab Project." www.csee.wvu.edu/~wise/biometric/index.htm, including Dec. 9, 2002 Proposal and May 5, 2003 Team Report.

S. Davies. Touching Big Brother. How Biometric Technology Will Fuse Flesh and Machine. Information Technology & People. vol. 7 (4) 1994.

Lawrence Aragon. Show me some ID. PC Week Online (www.zdnet.com/pcweek/0112/12bio.html) Jan. 1998.

Gerald Lazar. Agencies Scan Biometrics for Potential Applications. FCW.com (www.fcw.com.pubs.few.1997/0120/feature.htm) Jan. 1997 (printed Dec. 18, 1998).

Comparison of Biometric Identification Methods. www.and.nl/id/gen_biom.html. Dec. 1998 (printed Jan. 7, 2009).

The Speech Recognition API (SRAPI) Committee Announces Support for Speaker Verification. www.srapi.com/svapipr.html. Oct. 1996 (printed Jun. 29, 2006).

New Technology Enables Computers to Identify, Verify User Voices, www.srapi.com/savpi/pr041597.html. Apr. 1997 (printed Jan. 7, 2009).

Accounting 5544. Biometric Technology. acctserver.cob.vt.edu/faculty.jhicks/acct5544/present/ddeverea.htm. Apr. 1997 (printed Dec. 18, 1998).

Vault FAQs. www.ImagineNation.com/Xanadu/Vault. Jun. 1997 (printed Dec. 18, 1998).

John Daugman. The Scientific Basis for Iris Recognition. www.iriscan.com/basis.htm. Dec. 1998 (printed Jun. 23, 2006).

Electronic Banking 1, www.sjb.co.uk/ebl.html. Aug. 1998 (printed Jun. 23, 2006).

Biometric Technology Today (Btt). vol. 6(5) Sep. 1998.

Biometric Digest. Mar. 1998.

Biometrics in Human Services. vol. 2(1) Feb. 1998.

Video Insight. http://www.video-insight.com/dvr221.htm.

TMCnet. Cernium Installs Perceptrak Behavior Recognition Software in Public Parking Garage in Yonkers, www.tmcnet.com/usubmit/2003/Dec/1021669.htm. Dec. 2003.

City of Aspen. Parking, www.aspenpitkin.com/depts/61/payanddisplay.cfm.

SmartCity. SmartCity Card Solutions, www.coinamatic.com/coinamatic_group/html/apartment_laundry_services/smartcity/Products/p4.html.

TransCore. TransCore Access Control System First to Successfully Combine Biometrics and RFID, www.transcore.com/news/news050314.htm. Mar. 2005 (printed Jun. 22, 2006).

James P. Holmes et al., A Performance Evaluation of Biometric Identification Devices. Sandia Report. Jun. 1991.

IBM Technical Disclosure Bulletin, Title: selective receipt of document elements in an electronic mail system, Issue No. 429, TDB-ACC-No. NNRD429177, Jan. 2000, UK.

Davida et al., "On Enabling Secure Applications Through Off-Line Biometric Identification," p. 0148, 1998 IEEE Symposium on Security and Privacy, 1998.

\* cited by examiner

SYSTEM AND METHOD FOR ENROLLING IN A BIOMETRIC SYSTEM

CROSS REFERENCE TO RELATED APPLICATIONS

This application is a continuation of application Ser. No. 10/743,189 filed Dec. 23, 2003, now U.S. Pat. No. 7,367,049 which is a continuation-in-part of application Ser. No. 10/678,646 filed Oct. 6, 2003, which is a continuation-in-part of application Ser. No. 10/251,305, filed Sep. 20, 2002, now U.S. Pat. No. 7,269,737, which claims domestic priority from provisional application No. 60/324,229, filed Sep. 21, 2001. Each above-identified application is incorporated by reference herein, in its entirety, for all purposes.

FIELD OF THE INVENTION

This application relates generally to the method of enrolling information into a system for biometric recognition/verification. More particularly, the present invention relates to a method for enrolling portions of enrollment information in a system for biometric recognition and/or verification.

BACKGROUND OF THE INVENTION

Generally, systems that provide biometric recognition and/or verification for verifying an individual's identity, verifying an individual's age, or authorizing a financial transaction require that a system user undergo an enrollment. In an enrollment, the individual typically presents identity verifying information, documents to attest to his true identity, and one or more biometric scans. Biometric information is then presented in subsequent transactions to recognize or verify the user and to indicate to the system that the individual has undergone enrollment. After enrollment, a user is free to conduct transactions in the system. One problem with current methods of enrolling users in biometric systems is that the enrollment process is entirely dependent on users initiating enrollment into the system by providing one or more pieces of identifying information. An additional problem with current methods of enrolling users in biometric systems is providing users with a simple method of completing enrollment, thereby activating user records and enabling users to use the system. What is needed are better systems and methods for enrolling users to help streamline and improve the enrollment process.

SUMMARY OF THE INVENTION

The present invention addresses the aforementioned needs by providing a method of allowing system operators to create partial enrollment records for enabling individuals to use biometric identification/verification systems. A flexible process by which system operators initiate user enrollment enables system operators to better control user enrollment and activity in the system. Additionally, the present invention allows users to activate their operator-initiated user records quickly and easily to provide them with immediate access to the system's managed privileges.

DETAILED DESCRIPTION OF THE INVENTION

Additional objects and advantages of the present invention will be apparent in the following detailed description read in conjunction with the accompanying drawing figures.

As previously noted, the present invention encompasses a system and method for enrolling potential user information into a system for verifying identity through biometric recognition/verification. The disclosed enrollment method allows individuals to enter enrollment information into a system over multiple system accesses and additionally allows system operators to initiate user enrollment into the system. Allowing users to enter enrollment information into a system over multiple system accesses provides them with an accessible and forgiving method of presenting information into a biometric system. Whereas conventional methods of enrollment into a biometric system demand the total enrollment information all at once, the disclosed method allows individuals to enter enrollment information into a biometric system at their availability and convenience. Additionally, allowing a system operator to initiate user enrollment into the system provides the system operator with a greater degree of control over user enrollment completion and other system activity.

Figure 1:
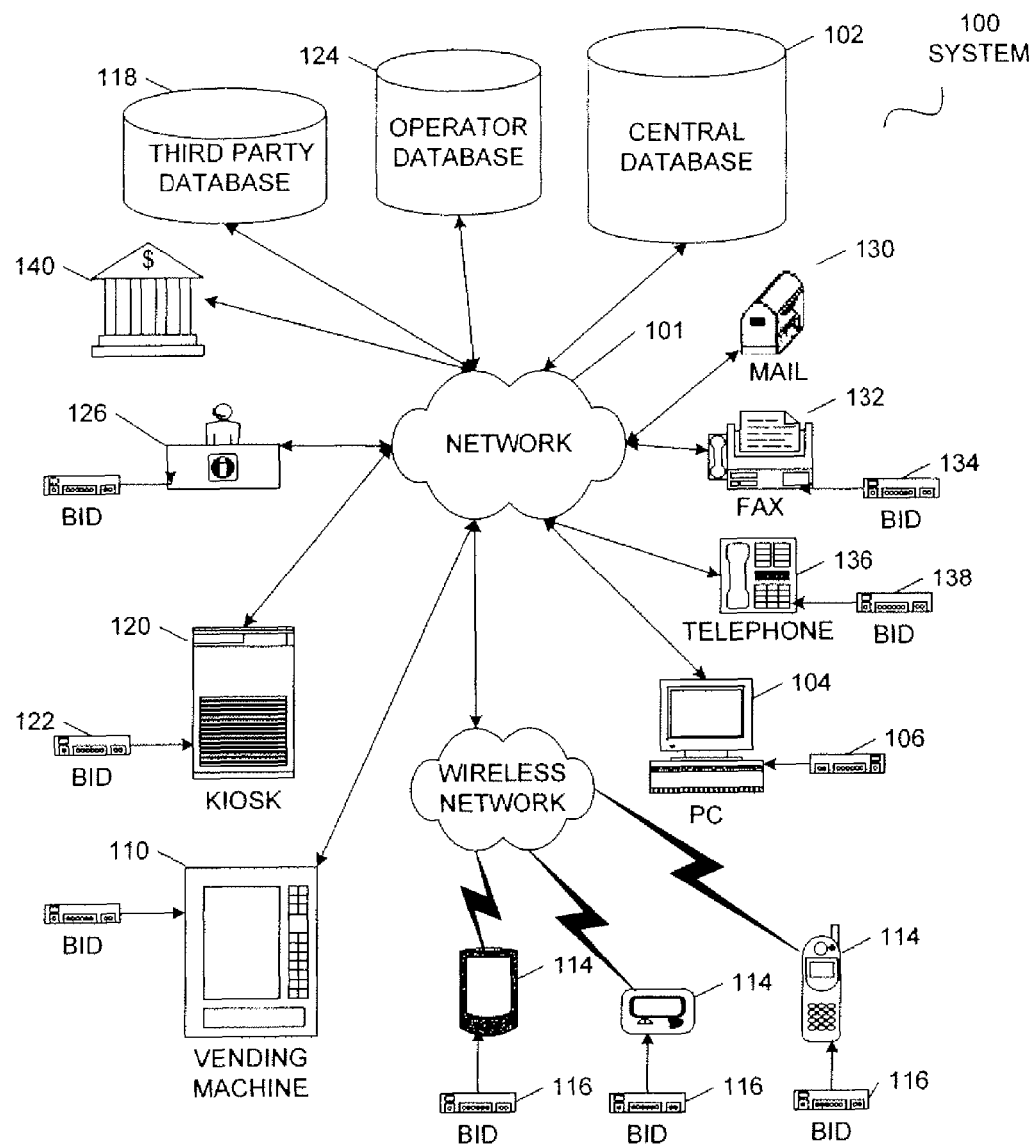
FIG. 1 illustrates an overview of the general architecture of a system for enrolling a potential system user to use a biometric system according to an embodiment of the present invention.

FIG. 1 illustrates a general architecture overview of an identity verification system 100 that is based on biometric recognition/verification. As will be described in greater detail below, identity verification system 100 enables a flexible enrollment process by which users are encouraged to provide registration information. This registration information is stored in at least one system database 102, 124 where system user records are stored. In one embodiment, the system database is a central database to which all system user records are stored and from which informational system user records are accessed for identity verification. In another embodiment, the system database is one or more operator databases 124 to which a select set of system operator records are stored and from which a select set of system operator records are accessed for identity verification. In an additional embodiment, identity verification system 100 may also utilize a combination of central databases 102 and one or more operator databases 124. In general, embodiments utilizing a combination of system databases 102, 124 enable increased control of information flow throughout identity verification system 100. As described in greater detail below, various examples of information flow configurations within the system can include "open," "closed," and "multiple system operator" system models. In still further embodiments, system database 102, 124 can further comprise one or more sub databases that are contained within a particular system database 102, 124. In such embodiments, system user data, system operator data, and other system data may be distributed across multiple databases within the system database.

A system user record holds system user recognition/verification and identity verifying information related to an individual seeking biometric recognition/verification so that the system user may identify himself with the system. The information held in such a record may include, by way of illustration and without limitation, a system user's government identification number(s) and corresponding state(s) of issue, home address, and a telephone number and at least one biometric record. A system user may present any number of identity verifying documents or testaments to his identity depending on the embodiment of the biometric system. By way of illustration and not of limitation, examples of such documents or testaments include a financial token, a digital image, a video clip, family information, or a DNA sample. Depending on the particular implementation, a system user record can also hold financial account information and/or a system identification number (SID). A SID is a code used in conjunction with a system user biometric scan for biometric recognition/verification. In an alternate embodiment, a system user may create a SID during a pre-enrollment session and then use that SID to identify himself during subsequent system accesses.

Additionally, system user records are marked according to various pre-active states of activity before the records have been enabled for use and have been marked active for use in a biometric identification/verification system. Such pre-active states may include but are not limited to idle pre-active, current pre-active, and bad pre-active. Idle pre-active system user records include those where a system user partial record has been created and the record has not been augmented or enabled. Current pre-active system user pre-enrollment records include those where a system user partial record has been created and the record is augmented on a regular basis. Bad pre-active system user records include those where a system user partial record has been created but fraud regarding information presented for storage or stored in that record has been detected. After a system user record includes enabling enrollment information, the system user record is marked active, and a history of the record's pre-active activity states is stored in the system user record. In an additional embodiment, system user records that are enabled and are marked active are also marked as verified or self-enrolled. Verified records are those that have been reviewed and verified by at least one system operator, third party, and/or third party database. Self-enrolled records are those that contain the necessary enrollment data needed to enable their respective system users to identify their identities in the system but that have not been verified.

System operator records hold information useful for authenticating an operator, such as a name or ID number, an address, and a phone number. In an alternate embodiment of the present invention, the operator records also hold employer information if the operator is an employee of an employer who is also an operator. In another embodiment of the present invention, operator records hold an operator SID and/or an operator biometric scan.

The system may be configured so that at least one system database 102, 124 is connected to at least one network 101, such as but not limited to, the Internet. This network comprises connections to at least one device where a system user may enter pre-enrollment information. These devices include but are not limited to a vending machine 110, a kiosk 120, a personal computer 104, an enrollment desk 126 or a wireless device 114, connected via wireless network, with or without respective biometric input devices (BIDs) 112, 122, 106, 128 and 116. The network also comprises connections to one or more enrollment desks 126 with connected BIDs 128 where system users may enable their enrollment records by presenting the remainder of system user information needed to allow the system user to use the system and where the enabling system access is monitored and verified by a system operator. The network also comprises connections to devices where system users may enable their enrollment records via synchronous or asynchronous operator observation and verification, such as a kiosk 120 with attached BID 122 and/or a vending machine 110 with attached BID 112.

Networks used in additional embodiments include LANs (local area networks), WANs (wide area networks), telephone networks and parcel delivery systems, such as but not limited to, the United States Postal Service, United Parcel Service, and Federal Express. In such embodiments, system users communicate with at least one system database 102, 124 via telephone 136 or fax 132, both which may or may not have connected BID devices 138 and 134, respectively. Such embodiments also allow system users to communicate with a system database via mail or parcel service 130.

Additional embodiments of the system also comprise connections to one or more third party sources, such as a third party database 118 and/or one or more financial institutions 140, in which system user-presented information is verified and/or from which system user information is pulled. Pre-enrollment and enrollment enabling devices compose pre-enrollment and enrollment enabling stations, respectively. Stations are composed of at least one pre-enrollment device and the necessary means for sending and receiving information to and from a system user and to and from a system database.

In one embodiment, the system is configured as an "open" system, meaning all information entered into the system is transmitted to and stored in a centralized system database 102. An open system allows system users to conduct enrollments at any enrollment station in the system because an open system shares system user information stored in the centralized system database 102 with all enrollment stations.

In an alternate embodiment, the system is configured as a "closed" system, meaning information entered into the system via a specific operator device is transmitted to and stored in a system database specific to that operator 124, and this information is not shared with other enrollment stations or other system databases. This is referred to as a "closed" system because system users who enrolled in one system operator's database 124 must enroll in the database of each additional system operator system wherein they would like to enroll their information. Operator system databases 124 in closed systems may query other databases, such as a third party information database 118, for system user information verifications. However, all system user information that is enrolled into a particular operator system database 124 is stored in that database. In an alternate embodiment of the closed system, information pertaining to specific system operators is stored in a partitioned, central system database 102. System operator related information is stored in system, operator-specific partitions and is closed to all other system operators. Only the system operator and system operator employees may access that partition of the central system database 102. In yet an additional embodiment, system operator related information stored in an operator system database is additionally stored on the central system database 102 where their system users' records are stored. Such an embodiment is useful for information protection in the event database information is lost.

In a further embodiment of the present invention, system user information is stored in select system multiple-operator databases or select, system multiple-operator partitions within the central system database 102. In this embodiment, a group of system operators share data with each other and they choose whether or not to share system information with other system operators within the system. Such a system is referred to as a "multi-operator" system. This system allows a chain of system operators owned by the same entity or linked in some other manner to share system user enrollment information amongst them without sharing that information with all other non-designated system operators registered in the system. Information in such a system may be shared between operator system databases 124 and the central system database 102 freely or sharing may be monitored by rules set in the operator system databases 124, the central system database 102, or both. By way of illustration and not as a limitation, one system operator might only want to share system user enrollment information with one of five system operators in a multi-verifier system or all system operators might not want to send or store system user enrollment information to the central system database 102.

The configuration of the system as an "open" system, "closed" system, or "multi-operator" system illustrates various ways of implementing the principles of the present invention. System configuration might be determined by the system in which the enrollment information is used. For example, a merchant who is an operator in the system and who conducts biometrically authorized customer loyalty programs might have a system configured with his own operator system database 124 and one or two biometric authorization terminals connected to that database. In this system configuration, the merchant's database files only exist on his database 124 and are retrieved or accessed for biometric matching only by the one or two pre-determined stations connected to the database 124; therefore, the system would be a "closed" system.

Figure 2:
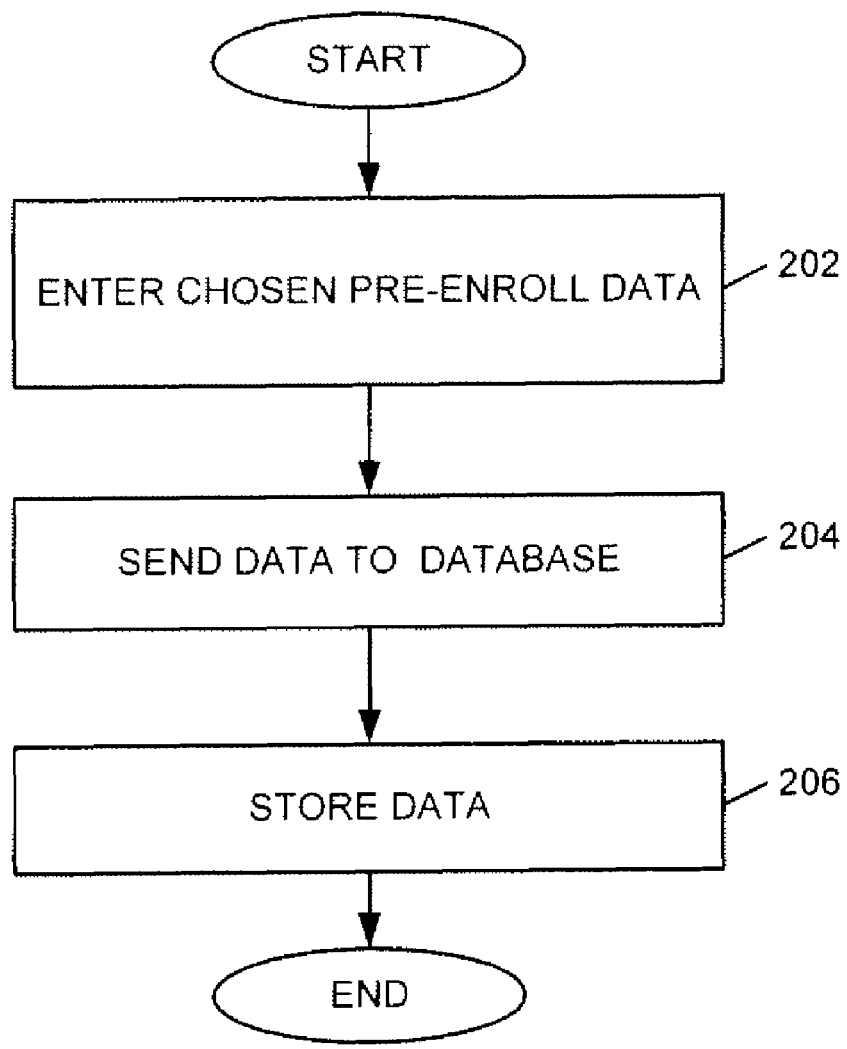
FIG. 2 illustrates a flowchart of a process for pre-enrolling information into a system for verifying identity through biometric recognition/verification.

Referring to FIG. 2, a flowchart of a process for pre-enrollment into a system for verifying identity through biometric recognition/verification is illustrated. For the purposes of this application, "pre-enrollment" is defined as providing less than the complete information required to enable usage of a system for biometric recognition/verification. As would be appreciated, determining the data required to enable usage of the system would depend on the embodiment of the system in which the individual is enrolling. For accessibility purposes, it is conceived that individuals may pre-enroll information into the system at their convenience.

At step 202, a system user is prompted to present a chosen portion of the data necessary for enabling usage of the biometric system. System users may pre-enroll as much or as little of the information as they wish, or as predetermined by the system. In an additional embodiment, the system may require or prohibit a system user from entering specified information during pre-enrollment. For example, a system user may be required to pre-enroll via a device 110,120,126 connected to a BID 112,122,128, where the system user must present a biometric scan. The system may also set other pre-enrollment restrictions, such as requiring a system user to sufficiently provide enabling enrollment information, any information not provided during a pre-enrollment access but needed to mark a user's system user record as active, within a set timeframe. Additionally, the system may be configured to allow a system user to enter pre-enrollment information in multiple system accesses or may require the system user to enter all specified pre-enrollment information during one system access.

At step 204, pre-enrollment information that the system user presents is sent to the system database for storage. In one embodiment, if the presenter sends her pre-enrollment information via print form through couriers, such as the United States Postal Service, the presenter's information is scanned or hand-keyed into the system database for storage. At step 206, the pre-enrollment information is stored for later pre-enrollment access and/or enabling-enrollment retrieval.

Pre-enrollment records are stored as partial records that cannot be used to identify a system user until the identified remainder of the system user enrollment information is stored in the system. Such partial records are marked in some manner to denote that the records are incomplete. Pre-enrollment records are stored in the system database but may be accessed by the system user for pre-enrollment information augmentation or by a participating system operator for enabling enrollment. System users may augment their pre-enrollment records during subsequent pre-enrollment accesses by presenting any portion of previously enrolled information into the system for identification and then presenting the desired augmenting information. It should be noted that a system user may augment his pre-enrolled information as often as he wishes during the pre-enrollment stage.

According to a closed embodiment of the system, pre-enrollment records are stored in one or more specified operator system databases 124. Such an embodiment asks system users to choose an operator system database with which to store their pre-enrollment information. According to a multi-operator embodiment of the system, system users select one or more chains of system operators with which to share their pre-enrollment record. Both closed and multi-operator systems may be configured to additionally store system user information in the central system database 102 and/or one or more operator system databases 124.

In an alternate embodiment of pre-enrollment, potential system user information is retrieved from a third party database 118. This information retrieval may be prompted by the system user or may be automated by the system. The third party database 118 may be for example an employer database, where information on all of that employer's employees is stored. A system user prompts retrieval of his information from a third party database 118, where his information is held, during either a pre-enrollment system access or an enabling access. He does so by providing information about the third party database 118 and an indicator. A system user identifies the third party database 118 that he wants the system to access for retrieving information by a means such as providing the enrollment station with the name of the entity with which the database is held. The indicator may include by way of illustration and without limitation a password that the system user has specified with the third party database 118 to indicate that he authorizes the system database pulling his information.

Information is automatically retrieved in a manner such as pulling the information from a purchased or acquired database. By way of illustration and not as a limitation, the system database operator could purchase driver's license data from a state or government database and save that information as pre-enrollment records. In an alternate embodiment, information obtained from third party databases 118 may also be used to verify information potential system users enter during pre-enrollment or enrollment enabling. This information could be easily entered into a system database 102,124 so that when system users, whose information was recorded in a system database 102,124 want to pre-enroll or enable enrollment in the system of the invention, some or all of that information contained within the third party database 118 would already be recorded within the system.

In an additional embodiment, the pre-enrollment information presented by the system user may be evaluated by a system database 102,124, one or more system database managers, or one or more system operators in an effort to run preliminary identity verifications on a system user before they attempt to enable enrollment. These preliminary identity verifications include but are not limited to using pre-enrollment information to check a system user's credit history; to verify identity documents presented during pre-enrollment; to verify presented information with third party databases 118; to verify financial account information by pre-noting the financial account through the Automated Clearing House (ACH) system; to verify financial account information by depositing an amount of money into a financial account, that amount serving as the system user's identification number within the system; to confirm presented information via an email or the US Postal Service; or to contact one or more third parties whose information was provided by the system user for system user identity verification. Results from these preliminary identity verifications are stored in the system user's record and used to evaluate the system user's enrollment enabling access. In an additional embodiment, system users can also re-present information that did not pass preliminary verification. The system user may re-present this information during another pre-enrollment access or an enrollment enabling access. Additionally, if the system user has enabled her system record and some portion of her information is not verified, the system may contact the system user and request her to re-present this information via a specified manner.

An additional feature of the present invention includes the system rendering incentives to system users for providing pre-enrollment information. In such an embodiment, the system may offer system users incentives for pre-enrolling to entice them into presenting a portion of enrollment information. For example, a vending machine stocked with incentives may be equipped as a pre-enrollment station. When a system user pre-enrolls her name in the system, the machine dispenses an incentive. Additionally, the system may offer incentives for augmenting information system users present after their initial pre-enrollment access in a subsequent pre-enrollment access. The machine might also notify the system user that if she augments her name data with her address and telephone number, she will receive another incentive. This would enable the system to further entice the now pre-enrolled individual to present even more information toward enabling her system user record and receive additional incentives in exchange for presenting that information.

Methods of rendering incentives within the system vary, but often the configuration of the pre-enrollment station determines the method in which incentives are rendered. For example, pre-enrollment devices such as vending machines are equipped to render incentives directly. This can be done by the system signaling a vending machine to directly dispense a pre-determined item. Other methods of rendering incentives include but are not limited to automated deposits, certificate print-outs and delivery through a parcel delivery service. Examples of automated deposits include direct automated deposits where a system user has registered financial account information with the system, and the system electronically credits the system user's financial account with a pre-determined monetary amount. Incentives are also rendered via automated deposits to the system user's system record. A rendering note is stored in the system user's record and the system user may retrieve that incentive at any system-determined point of retrieval. For example, a participating merchant in the system allows a system user to access her system record and one or more incentives stored therein are redeemed with the merchant for pre-determined or system-user-selected items. Incentives are also rendered via print-outs. This method of incentive delivery is most applicable in rendering incentives that cannot be directly dispensed or electronically delivered. For example, a registration station is equipped with a printing device and it prints a gift certificate, coupon, discount, and/or redemption number and redemption instructions. Incentives are also deliverable via a parcel delivery service.

In an additional embodiment, the system allows the system user to select from two or more incentives. Systems that allow system users to choose an incentive from a number of choices serve a two-fold purpose. One, they provide a greater response from the system user by providing him with a choice of incentive, thereby increasing the chance that the system is offering him something he might want. Two, this method also allows the system to obtain further information about the user by profiling him according to his incentive selection, which helps the system determine his likes, needs and wants. Such information might also be useful in determining a personalized incentive selection that would entice the system user to present even more information into the system. Such system configurations also allow the system to conduct market research by asking a system user feedback questions in subsequent accesses about the incentive(s) he received on his last system access.

Figure 3:
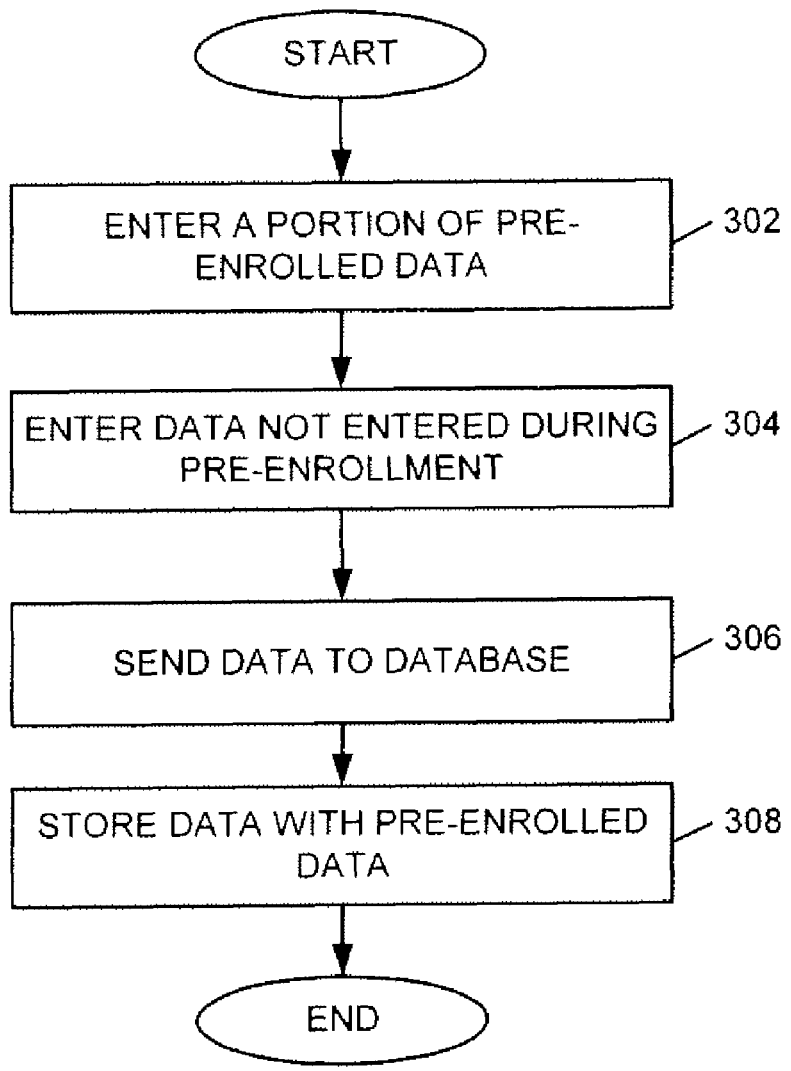
FIG. 3 illustrates a flowchart of a process for enrolling information that enables a system user to verify his identity through biometric recognition/verification in a biometric system.

Referring to FIG. 3, a process for enrolling information that enables a system user to verify his identity through biometric recognition/verification in a biometric system is illustrated. At step 302, the potential system user who wishes to enroll enabling information in the system and who has already provided a portion of the necessary enrollment information during manual or automatic pre-enrollment presents at least one portion of the pre-registered information. By way of illustration and without limitation, information that might be entered to identify the system user may be a telephone number, a name, a biometric, a driver's license number, or a social security number that the system user pre-enrolled in the system. At step 304, the system user is then prompted to enter any enrollment information that he did not enter during pre-enrollment. At step 306, the information entered is sent to a system database 102,124 where, at step 308, it is stored with its matching pre-enrollment record. If enrollment enabling parameters are met, the record is marked as enrolled and as active in the system. The system user may then use his record for biometric related transactions.

In an additional embodiment, the system evaluates enabled system records to ensure that they contain the necessary information for fully enrolling a system user to use a biometric system. If, during this evaluation, any information is missing from or is unverified in a system user record, the system user is offered an opportunity to enter the missing information indicated by the system or correct previously entered information that is not verified. Further, the system may be configured to allow system users to review information that they entered into the system during any system access or any information pertaining to them that was provided by a third party information database. This information may be displayed to the system user via electronic display during a pre-enrollment access or enrollment enabling. If any information displayed to a system user is incorrect, the system user indicates this to the system in some manner via keypad and then corrects the incorrect information.

In an additional embodiment of enrolling enabling information, a system user's record retains an inactive status until information the system user entered is verified with one or more third party sources. This embodiment assures that both pre-enrollment and enrollment enabling information is verified. Further additional embodiments may only verify specific information that typically requests higher security, such as financial account information. Once the necessary information is verified, the system user's record is marked active. If, during verification, a portion or all of a system user's information is not verified, a system manager and/or system operator contacts the system user to notify her that she must re-present the unverifiable information. Depending on the embodiment of the invention, the system user may re-present the unverifiable information via any enrollment device.

Figure 4:
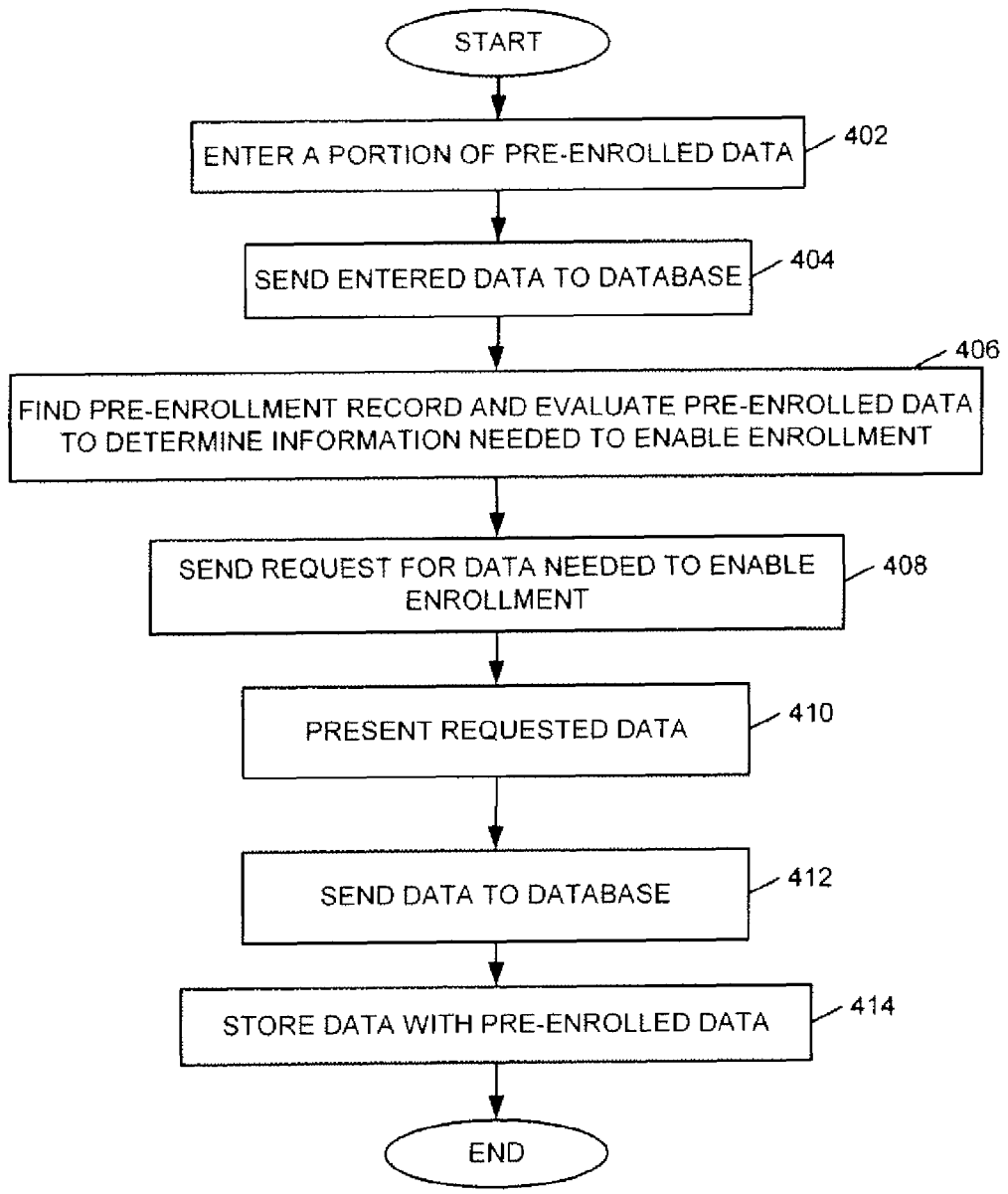
FIG. 4 illustrates a flowchart of a process for enrolling information that enables a system user to verify his identity through biometric recognition/verification in a biometric system.

Referring to FIG. 4, a process for enrolling information that enables a system user to verify his identity through biometric recognition/verification in a biometric system. At step 402, the potential system user who wishes to complete enrollment and who has already provided a portion of the necessary enrollment information during manual or automatic pre-enrollment presents at least a portion of the pre-registered information. By way of illustration and without limitation, information that might be entered to identify the system user may be a telephone number, a name, a biometric, a driver's license number, or a social security number that the system user pre-enrolled in the system. At step 404, the information the system user enters is sent to a system database 102,124. At step 406, the pre-enrollment record linked to the information sent to the system database is evaluated to determine what information is needed to enable the system user to use the system and at step 408, a request for that information is sent to the enrollment device 110,120,126. At step 410, the system user presents the requested information, and at step 412, all entered information is sent to the system database where at step 414, it is stored with its matching pre-enrollment record. Once the record contains enrollment enabling information, the record is marked as enrolled and is marked active within the system.

Both methods of enabling enrollment might further include offering pre-enrolled system users incentives to provide enabling information. Such an embodiment would entice pre-enrolled system users to present enabling information into the system sooner than the system user anticipated.

In an additional embodiment, system operators provide pre-enrollment verification and/or enrollment enabling verification. An operator may provide verification in numerous ways. In the simplest form of operator verification, the operator identifies herself to the system to show the system that she is present at the pre-enrollment station and/or enrollment enabling station. The operator may identify herself in a manner such as pressing a designated key on the station device, entering an operator code, or entering operator-specific identity information such as an operator biometric sample. The system can more easily track and monitor an operator's verifying behavior if the operator presents operator-specific information. In a system embodiment with higher security requirements, operators review the information a system user presents during a pre-enrollment and/or enrollment enabling and signal verification of the information presented. This signal might mean that the verifier only glanced over system user identity documents to make sure they looked authentic. The signal could alternatively comprise more complicated methods of verification such as a system operator contacting a credit database to verify the system user's credit history based upon an identity document the system user present during the enrollment. In a further embodiment, system operators may also verify enrollment from a remote device. Such enrollment verification can be done in a real-time evaluation set-up, where system user information is verified during the same system access in which it is entered, or enrollment verification can be done atemporally, where system user enrollment information is verified at some point after he has entered his enrollment data but before his record is marked active. In either case, in such an embodiment, the system user would not be able to use his system user record until his enrollment information had been verified according to system-based parameters. In a further embodiment, an enrollment is verified by an automated operator, which would use a special code to identify itself to the system that would indicate that it is an automated verifier. Regardless of the method of operator verification of a system user's presented enrollment information, operator verification indicators are stored in the system user records in which they verify information. The system may also reward system operators who verify system user information by offering operators incentives for persuading system users to take action within the system. For example, a system operator might be offered an incentive for every fifty system users they persuade to enable enrollment in the system.

In an additional embodiment, system users may pre-enroll, enable enrollment, and their system record may be marked active upon enrollment enabling without their enrollment information being verified by a system operator. In such an embodiment, the system user's record would be marked to denote that she is conducting transactions in the system as a self-enrolled system user. A self-enrolled system user might be restricted from performing certain transactions and may be required to re-represent a portion or all of her enrollment information to conduct those transactions. Once a system operator verifies a self-enrolled system user, the system removes the self-enrollment mark from the system user's enrollment record.

In an additional embodiment, information transferred between two points in the system is encrypted. For purposes of example and without limitation, information may be encrypted at one point and sent across a non-secure connection between the points or not encrypted at a point of communication and sent to the other point of communication across a secure connection. Encryption and decryption of these messages may be monitored by services provided by a company such as VeriSign. As an added level of security, one alternate embodiment encrypts even information internal to a terminal and which is never transmitted in a communication. This prevents retrieval of sensitive information (e.g., data corresponding to a biometric scan) from a stolen terminal. In an additional embodiment, the system incorporates one or more anti-tampering methods by which to recognize authentic and non-authentic system requests.

According to another embodiment, pre-enrollment and/or enrollment completion procedures may additionally comprise providing system users with printed or electronic records of their system access. The electronic records may take various forms such as but not limited to a media output to a personal data assistant, a smartcard, a cell phone, and an email address. Information included in these reports may be any information pertinent to the system access performed, such as access date and time, a transaction number, enrollment information enrolled during pre-enrollment, necessary enrollment information to complete an enrollment, instructions on how to complete a pre-enrollment, information on where to complete an enrollment, and/or instructions on how to contact customer service.

It is also an alternate embodiment of the present invention to provide operators with system user and other operator profile reports in case of suspected fraudulent activity within the system. These reports may be customized to display selected information from a system user's or system operator's record.

According to another hybrid embodiment, the system may be configured to send an identification number associated with a pre-enrollment/enrollment device (e.g., terminal identification number or serial number) and/or connection (e.g., internet protocol address) along with pre-enrollment or enrollment completion information. Such an embodiment is conceived to increase system security.

In an additional pre-enrollment embodiment, system operators initiate user registration into the system by creating user pre-enabled records. System operators create user pre-enabled records by entering information typically used to pre-register a user in the system. Such an embodiment simplifies an enrollment completion for a "system operator pre-enabled" user by requesting users to only present a minimal amount of information, including a biometric, to complete the enrollment process.

Figure 5:
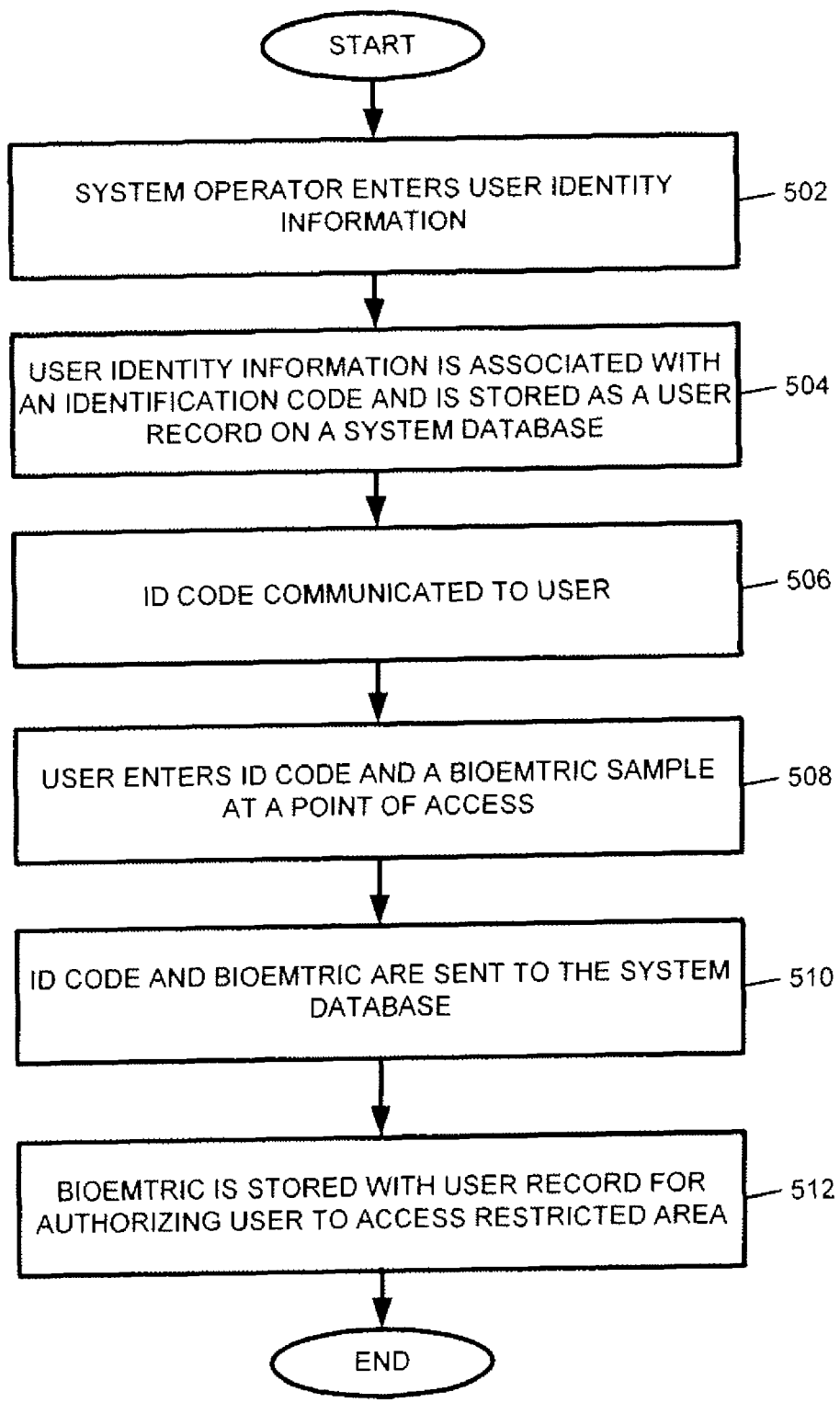
FIG. 5 illustrates a flowchart of a process for a system operator to initiate a user enrollment in a biometric recognition/verification.

Referring to FIG. 5, a process for a system operator to initiate user enrollment in a biometric recognition/verification is illustrated. At step 502, a system operator enters user identity information necessary for pre-enabling the user in the system. The system operator may enter this information and/or pull this information from a third party or third party database via any of the previously described system devices connected to the system database in the system 100. The identity information entered may be by way of illustration and not as limitation, a user name, a user identification number, and/or user affiliation information. Regardless of what is entered, the information is used to label and help the system operator identify users he pre-enables in the system. For the purpose of increasing system security, the system operator might additionally identify himself in the system by entering data stored in the operator's system record. For example, the system operator might enter a code associated with his system record or a biometric that matches a biometric stored in his record. In an additional embodiment, the system operator may choose not to enter user identity information into the system to create a user record but may choose to only generate/create a user identification code. In such an embodiment, step 502 may be obviated and the user identification code the system operator generates/creates in the following step 504 serves as the user's identity information stored as the user's system record.

At step 504, the user identity information entered is associated with an identification code and is stored as a partially enabled user record on a system database. The identification code is, for example, an identifier associated with the user record that the user presents in order to identify herself to the system during her record enablement session. However, the identification code also may serve as a supplemental identifier a user enters to help identify herself to the system after the user has enabled her enrollment in the system. This embodiment is described in greater detail below with respect to system identification numbers. The identification code may be a simple or complex code, simplicity and complexity being determined by the number of alphanumeric characters in the code or the method in which the code is communicated to the user and in which the user communicates the code to the enrollment finalization device. The identity code may be randomly or systematically generated by the system. In an additional embodiment, should he want to increase system security, the system operator presents a number for the system to associate with the user pre-enabled record as the user's identification code. A system operator may present an identification code of any relevance to the user he is pre-enabling; for example, the system operator might want the identification code to be a personal number affiliated with the user that most likely only the user and/or the user and a select few know, such as a social security number, driver's license number, and/or date of birth. If the system operator does not know or does not have access to any of a user's personal numbers, he may have the system pull a specified number type from a third party database. For example, the system operator may tell the system he wants the user pre-enablement record associated with the user's driver's license number. The system would then pull from a third party database, in this case most likely a Department of Motor Vehicles, the user's driver's license number and that number would be associated with the user's pre-enablement record. Once this information is stored in the database, the user is pre-enabled in the system.

Continuing with the description of FIG. 5, at step 506, the identification code associated with the user's pre-enabled record is communicated to the user. This communication of the identification code between the system operator and system user might be the system operator contacting the user via a phone, email or another common communication method. In an additional embodiment, if the identification code is a user personal number, the system operator might only communicate to the user an identification code descriptor (e.g., "your identification code is your driver's license number") without relaying the exact alphanumeric characters of the code. In yet an additional embodiment, the system might automatically communicate the code or a code descriptor directly to the user, provided the system has access to user contact information, which might be provided by the operator or accessed through a third party or third party database. The system may also communicate a portion or all of the user's identification code to her automatically through a deposit of a specific amount into a user deposit account, such as a checking account. For example, assuming a user's checking account information is stored in the system, the system may deposit an amount of money into the user's checking account, that amount of money serving as the user's identification code or a portion of the identification code. If the deposited amount only represents a portion of the identification code, that code may be added to one or more of other system deposit amounts, the user's personal numbers or any previously system-communicated number. In yet a further embodiment, step 506 may be obviated by requiring that all user identification codes be the same type of number; for example, all identification codes are user social security numbers. Therefore, system-wide all users would either know that they needed to enter their social security numbers or they would be prompted at the enabling device to enter their social security numbers.

At step 508, a user desiring to enable herself to use the system enters the identification code associated with her pre-enabled user record and enters her biometric sample. The user may present the identification code by simply entering it into a keypad connected to a device within the system or any device registered with the system. For example, a user with access to a system-registered telephone that accepts and communicates biometric information might activate her record via the telephone. The system would be caller ID enhanced, therefore verifying the system-registered telephone. In such an embodiment, the system user might enter her designated identification code plus her biometric sample. In an alternate embodiment, the system-registered telephone's registration identifier might serve as the user's identification code and the user would only need to enter her biometric sample at that telephone to activate her system user record. Additionally, to increase security, the user might present a token or device that stores her identification code and/or present a token or device that additionally verifies her identity but does not store her identification code. If the identification code is stored on a token or device, the identification code may then be pulled from the token/device the user presents via magnetic (MAG)

stripe read, two-dimensional (2-D) barcode read, infrared device communication, and/or another known method of reading tokens or transmitting information from one device to another.

In an alternate embodiment of enrollment finalization, the system might additionally request the user enter a system identification number (SID) to complete user enablement for system usage. Such a number would be used in systems that index biometric records according to user-specific codes and would be used in conjunction with the user's presented biometric sample to help locate the user's system record within the database. Systems configured in this manner would require the user to enter her registered SID in conjunction with her biometric sample when accessing the system once she is enabled to use the system. SIDs may be configured in various ways, depending on system implementation. For example, the SID may be a code designated by the user or a code the user selects from a group of codes designated by the system. Additionally, in cases where a user's identification code is simple and where the identification code meets SID requirements for the system (e.g., system may require SIDs to be unique or semi-unique numbers within the system), the user may use her identification code as her SID.

At step 510, the information the user presents is sent to the system database, where at step 512 if the identification code the user presents matches a user identification code stored in the database, the user biometric sample is stored with the user pre-enablement record to activate the user as an enabled user of the system. In an additional embodiment of user enablement, the system is configured to retrieve and display to the user the user information stored in the database, provided the user identification code presented matches the code stored in conjunction with that user information. In such an embodiment, the system might also be configured to present the user with an opportunity to confirm the information presented and if any information presented is incorrect, correct the information. Additionally, if in activating her user record the user is also seeking access to the system, she is granted access. In an additional embodiment, the system might seek approval of a system operator, most likely the system operator that pre-enabled the user, before allowing a user to enable her record and/or before the user is granted access.

In an additional embodiment, the system operator may associate with a pre-enabled user record system usage parameters. Such parameters could be set to regulate various aspects of a user's record and a user's access to his record and to the system, including the life of a user's partially enabled record, the life of a user's record once enabled, the user's system usage frequency, the point(s) at which the user may access the system, and the time(s) at which the user may access the system. For example, consider a scenario where a homeowner (system operator in this example) wants a house cleaner (user in this example and hereon "cleaner") to be able to access his home when he is not there. But, the homeowner only wants the cleaner to have access to his house at certain times, specifically between 4 PM and 5 PM on Wednesdays. Therefore, the homeowner would pre-enable the house cleaner, the house cleaner would enable himself to access the homeowner's home by presenting his biometric and a previously communicated identification code, and the house cleaner would be granted access to the homeowner's home, either immediately if it is between 4 PM and 5 PM on a Wednesday or at a later time upon re-presentment of his biometric.

The system operator may set user parameters at any time during the life of a user's pre-enabled or enabled system record. The system operator may also grant users privileges to pre-enable other users, in effect granting them a sub-operator status. With such an allowance, a user may act as a system operator, with the limitation that the system operator may set parameters to regulate the sub-operator's actions within the system. Additionally, in such an embodiment the system operator may choose to have the system contact him in an effort of seeking approval for one or more users for which sub-operators requested pre-enablement.

In another embodiment, a system operator may pre-enable several users at once. The system operator might accomplish this by submitting an existing database or a portion of an existing database of user information to the system, which would generate pre-enablement records for each set of presented information specific to a single user stored in the submitted database. For example, a car rental business (system operator in this example) that offers customers a rental club membership might submit their database of customers' information registered in their rental club (users in this example) to the system database. The system stores each customer's information, which, for example, is the customer's club membership number, customer's name, special club privileges, and customer's home address, as a pre-enabled record and associates with it an identification code. For simplicity, the identification code associated with each customer's pre-enabled record might be the customer's rental club member number. All customers enrolled in the rental club membership could then activate their user record by presenting their club membership number and a biometric sample at a point of enablement.

In linking a club member's membership information with the system, a system operator might additionally want to allow club members access to all activities/privileges typically received by presenting the club membership token or identification number to be granted upon presentment of a matching user biometric stored in the system database. Once any user pre-enabled from the information pulled from the membership database activates their system account, they would be enabled to perform any action that can be performed by presenting the club membership by presenting a biometric sample instead. For example, a club member may have registered a credit card with the rental club when they signed up for use in authorizing rental charges to that credit card with submission of the membership token. However, once that rental club member is an enabled system user, he may authorize the system to charge his registered credit card by presenting his biometric. In related biometric access settings, a car rental club may possess cars that are accessed and/or operated via biometric authentication. A biometric device in such a system might be centrally located in relation to a rental car lot, perhaps located on a key box that dispenses rental car keys to club members who have successfully enabled themselves to use the system. Or, the device might be located on a control box that is able to communicate user system information with networked cars on the car lot and activate user privileges at one or more of those networked cars, enabling an active user to present his biometric to access and/or operate the networked cars. Additionally, each rental car on the lot might be equipped with a biometric device networked to a central database, restricting physical access to the car and/or restricting the ability to start and operate the car. In any case, in such an embodiment it is envisioned that system users are allowed to enable themselves for immediate rental access to one or more cars and/or be granted immediate rental access if they were previously enabled for access in the system.

In an additional embodiment of a bulk user pre-enablement, the system operator sets user parameters. The system operator might choose to associate the same set of system privileges to the entire group of users she pre-enables. Alternatively, the system operator may designate the user's info into two or more groups with which she associates specific, differing usage parameters. For example, in reference to the above membership club bulk pre-enable, some of the members special club privileges include granting members who pay a fee a discount program that gives them a thirty-five percent discount on hotel room rentals. Therefore, this privilege could be set within the system by setting usage parameters designating those members who have paid the referenced fee as a sub-group that is granted this privilege.

Along with setting user system parameters, a system operator may monitor one or more users' system usage by obtaining records via one or more system device 130, 132, 104, 114, 110, 120, 126. The system may be configured to output user system histories via a specific method or may be configured to allow system operators to select how they would like to receive such information, such as via print or electronic outputs from a system device. Additionally, the system may be configured to send the user whose record history has been requested a record of the request. Such communication could be sent by a system operator or automatically by the system database.

Another system operator privilege that gives operators more control over their pre-enabled users allows them to revoke a user's access of the system at any time and for any reason. A system operator might revoke a pre-enabled or enabled user's usage of the system by deleting the user's system record from the database, marking a user's system record as in bad standing with one or more system operators, or marking the user's record as in bad standing with the network and/or one or more system operators and designating a period of time for which the record will remain bad. This period of time might be relative to an action that must be performed by the user with the record marked in bad standing.

User system access is accomplished by a user presenting his biometric and that biometric being matched with the biometric of an enabled user stored in the system database. It is possible that the user may seek access through the system and be denied access even though the user is fully enabled and his record has no history of fraudulent system usage. If this occurs, the user can request an immediate system override through a point of access device connected to the system 126, 120, 110, 114, 104, 138. A system override may be activated through any number of ways, such as selecting an option on a screen attached to the access device or pressing a designated button. System override requests are handled by communicating with the system operator who pre-enabled the user seeking a system override. This communication can be automated by the system database or prompted by the system database to a communication center that communicates with the system operator. Communication can be achieved through any number of ways, such as calling the system operator on his cell phone, emailing him, and/or text messaging him. The system might also allow a system operator to designate other individuals, system operators and/or users, as points of contact for approval/denial of system overrides. Additionally, the system may be configured to allow the system operator to create rules by which to accept/decline system override requests automatically. For example, the system operator might always want to trust a specific user to access the system when that specified user submits an override request.

A system and method for pre-enrolling in a biometric identification/verification system has been illustrated. It will be appreciated by those skilled in the art that the system and method of the present invention can be used to perform more convenient and more operator-initiated enrollments into biometric systems. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above the invention is capable of other embodiments and of being practiced and carried out in various ways that would be apparent to one of ordinary skill in the art after reading the disclosed invention, and therefore the above description should not be considered to be exclusive of these other embodiments. Also, it is to be understood that the phraseology and terminology employed herein are for the purposes of description and should not be regarded as limiting.

What is claimed is:

1. A method for enabling a user to access a biometric system, the method comprising:
   receiving a portion of user information for enabling the user to access the biometric system, the information presented by a system operator;
   storing, in a database, in association with an identification code the portion of user information as a partially enabled user record;
   communicating information pertaining to the identification code to the user, wherein the information pertaining to the identification code includes an identification code descriptor;
   receiving, at a system point of access, a record enablement request, the request including the identification code and user biometric data; and
   storing the user biometric data with the user record.

2. The method of claim 1, further comprising associating with the user record access parameters indicated by the system operator that determine the manner in which the user utilizes the biometric system.

3. The method of claim 1, further comprising marking the user record as active.

4. The method of claim 1, wherein the identification code is associated with a token.

5. The method of claim 1, wherein the identification code is known to the user.

6. The method of claim 1, wherein the identification code is electronically obtained.

7. The method of claim 1, wherein the identification code is obtained from a token.

8. The method of claim 1, wherein the identification code is obtained from a device.

9. The method of claim 1, wherein the information pertaining to the identification code includes the identification code.

10. A method for enabling a system operator to enroll a user within a system for biometric authentication, the method comprising:
    receiving, from the system operator, defined access rights for a user of the biometric authentication system;
    storing the defined access rights in association with an identification code as a partially enabled user record; and
    communicating information pertaining to the identification code to the user, the identification code enabling said user to activate the user record through the provision of biometric data, wherein the information pertaining to the identification code includes an identification code descriptor.

11. The method of claim 10, wherein the identification code associated with the user record is chosen by the system operator.

12. The method of claim 10, wherein the information pertaining to the identification code includes the identification code.

* * * * *